US 12,293,153 B2

United States Patent
Shachor et al.

(10) Patent No.: US 12,293,153 B2
(45) Date of Patent: May 6, 2025

(54) FUZZY MATCHING OF OBSCURE TEXTS WITH MEANINGFUL TERMS INCLUDED IN A GLOSSARY

(71) Applicant: International Business Machines Corporation, Armonk, NY (US)

(72) Inventors: Shlomit Ifergan Shachor, Yokneam Eilit (IL); Natalia Razinkov, Haifa (IL); Micha Gideon Moffie, Zichron Yaakov (IL); Omer Yehuda Boehm, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 303 days.

(21) Appl. No.: 17/892,169

(22) Filed: Aug. 22, 2022

(65) Prior Publication Data
US 2024/0062004 A1    Feb. 22, 2024

(51) Int. Cl.
*G06F 40/284*    (2020.01)

(52) U.S. Cl.
CPC ................. *G06F 40/284* (2020.01)

(58) Field of Classification Search
CPC .. G06F 40/284; G06F 16/2468; G06F 40/194; G06F 40/237; G06F 704/09
See application file for complete search history.

(56) References Cited

U.S. PATENT DOCUMENTS

| | | | |
|---|---|---|---|
| 6,718,325 B1* | 4/2004 | Chandra | G06F 16/90344 |
| 7,296,011 B2* | 11/2007 | Chaudhuri | G06F 16/215 |
| 7,870,151 B2 | 1/2011 | Mayer | |
| 8,073,869 B2* | 12/2011 | Li | G06F 40/232 |
| | | | 707/780 |
| 8,219,550 B2 | 7/2012 | Merz | |
| 10,191,974 B2 | 1/2019 | Indeck | |
| 2004/0260694 A1* | 12/2004 | Chaudhuri | G06F 16/215 |
| | | | 707/999.005 |
| 2005/0102303 A1 | 5/2005 | Russell | |

(Continued)

OTHER PUBLICATIONS

Hiba Khalid et al., "Fuzzy Metadata Strategies for Enhanced Data Integration"; In Proceedings of the 7th International Conference on Data Science, Technology and Applications (DATA 2018), pp. 83-90, 2018.

Jiannan Wang et al., "Fast-join: An efficient method for fuzzy token matching based string similarity join"; Conference: Proceedings of the 27th International Conference on Data Engineering, ICDE 2011, Apr. 11-16, 2011.

(Continued)

*Primary Examiner* — Fariba Sirjani
(74) *Attorney, Agent, or Firm* — Kimberly Zillig

(57) ABSTRACT

A method comprising: obtaining multiple glossary terms each comprising one or more words; generating multiple fuzzy tokens from each word of each of the glossary terms; calculating a similarity score for each of the fuzzy tokens, the similarity score denoting a similarity between the respective fuzzy token and its respective word; obtaining multiple input terms to be matched with the multiple glossary terms; separating each of the input terms into multiple input tokens; generating multiple n-grams from each of the input tokens; comparing the n-grams with the fuzzy tokens, to output a list of matching n-grams and fuzzy tokens; based on the list of matching n-grams and fuzzy tokens, identifying, from the glossary terms, candidate glossary term matches for each of the input terms; and calculating one or more scores that quantify the match between each of the candidate glossary term matches and its respective input term.

15 Claims, 2 Drawing Sheets

(56) References Cited

U.S. PATENT DOCUMENTS

| | | | |
|---|---|---|---|
| 2008/0091413 A1* | 4/2008 | El-Shishiny | G06F 16/322 |
| | | | 704/10 |
| 2008/0120072 A1* | 5/2008 | Bartz | G06F 16/374 |
| | | | 707/E17.081 |
| 2009/0182728 A1* | 7/2009 | Anderson | G06F 16/113 |
| | | | 707/999.005 |
| 2011/0184893 A1 | 7/2011 | Paparizos | |
| 2012/0059821 A1 | 3/2012 | Li | |
| 2019/0018904 A1 | 1/2019 | Russell | |
| 2020/0210478 A1 | 7/2020 | Wada | |
| 2020/0327252 A1 | 10/2020 | McFall | |
| 2021/0020277 A1* | 1/2021 | Guo | G06F 16/335 |
| 2023/0086791 A1* | 3/2023 | Bierner | G06F 16/24575 |
| | | | 707/722 |
| 2024/0062004 A1* | 2/2024 | Shachor | G06F 40/237 |

OTHER PUBLICATIONS

Tao Cheng et al., "Fuzzy matching of Web queries to structured data"; IEEE 26th International Conference on Data Engineering (ICDE 2010), pp. 713-716, Mar. 1-6, 2010.

Apache Software Foundation, "Apache Lucene," Retrieved from: https://lucene.apache. org, Aug. 8, 2022, 2 pages.

Apache Software Foundation, "Class FuzzyQuery," Retrieve from: https://lucene.apache.org/core/8_0_0/core/org/apache/lucene/search/FuzzyQuery.html, Aug. 8, 2022, 7 pages.

Apache Software Foundation, "Class SpellChecker," online at: https://lucene.apache.org/core/6_0_1/suggest/org/apache/lucene/search/spell/SpellChecker.html, Aug. 8, 2022, 10 pages.

* cited by examiner

FUZZY MATCHING OF OBSCURE TEXTS WITH MEANINGFUL TERMS INCLUDED IN A GLOSSARY

BACKGROUND

The invention relates to the field of computerized text analytics and natural language processing (NLP).

Fuzzy text (or "string") matching is considered a relatively difficult text analytics task, which involves assigning a match score to the relation between two strings of text according to some similarity function.

Fuzzy text matching techniques are the basis of many spell-checkers and autocorrection/autocompletion tools, and are also widely used in search engines, for example when a search query appears to be mistyped.

Some fuzzy text matching techniques employ a similarity function which is based on some variant of edit distance (e.g. Levenshtein distance), which is the minimum number of single-character edits (insertions, deletions, or substitutions) required to change one text into the other. The lower the edit distance, the higher the similarity between the texts.

Each technique is not without its drawbacks. Different fuzzy text matching techniques perform very differently on different types of texts and different linguistic domains. Many techniques provide unacceptably poor results in certain scenarios, leaving users who are faced with these scenarios with no good text matching solutions.

The foregoing examples of the related art and limitations related therewith are intended to be illustrative and not exclusive. Other limitations of the related art will become apparent to those of skill in the art upon a reading of the specification and a study of the figures.

SUMMARY

The following embodiments and aspects thereof are described and illustrated in conjunction with systems, tools and methods which are meant to be exemplary and illustrative, not limiting in scope.

One embodiment provides a computer-implemented method comprising: obtaining multiple glossary terms each comprising one or more words; automatically operating a fuzzy token generator to generate multiple fuzzy tokens from each word of each of the glossary terms; automatically calculating a similarity score for each of the fuzzy tokens, wherein the similarity score denotes a similarity between the respective fuzzy token and its respective word; obtaining multiple input terms to be matched with the multiple glossary terms; automatically operating a tokenizer to separate each of the input terms into multiple input tokens; automatically generating multiple n-grams from each of the input tokens; automatically comparing the n-grams with the fuzzy tokens, to output a list of matching n-grams and fuzzy tokens; based on the list of matching n-grams and fuzzy tokens, automatically identifying, from the glossary terms, candidate glossary term matches for each of the input terms; and automatically calculating one or more scores that quantify the match between each of the candidate glossary term matches and its respective input term.

Another embodiment provides a system comprising: (a) at least one hardware processor; and (b) a non-transitory computer-readable storage medium having program code embodied therewith, the program code executable by said at least one hardware processor to: obtain multiple glossary terms each comprising one or more words; automatically operate a fuzzy token generator to generate multiple fuzzy tokens from each word of each of the glossary terms; automatically calculate a similarity score for each of the fuzzy tokens, wherein the similarity score denotes a similarity between the respective fuzzy token and its respective word; obtain multiple input terms to be matched with the multiple glossary terms; automatically operate a tokenizer to separate each of the input terms into multiple input tokens; automatically generate multiple n-grams from each of the input tokens; automatically compare the n-grams with the fuzzy tokens, to output a list of matching n-grams and fuzzy tokens; based on the list of matching n-grams and fuzzy tokens, automatically identify, from the glossary terms, candidate glossary term matches for each of the input terms; and automatically calculate one or more scores that quantify the match between each of the candidate glossary term matches and its respective input term.

A further embodiment provides a computer program product comprising a non-transitory computer-readable storage medium having program code embodied therewith, the program code executable by at least one hardware processor to: obtain multiple glossary terms each comprising one or more words; automatically operate a fuzzy token generator to generate multiple fuzzy tokens from each word of each of the glossary terms; automatically calculate a similarity score for each of the fuzzy tokens, wherein the similarity score denotes a similarity between the respective fuzzy token and its respective word; obtain multiple input terms to be matched with the multiple glossary terms; automatically operate a tokenizer to separate each of the input terms into multiple input tokens; automatically generate multiple n-grams from each of the input tokens; automatically compare the n-grams with the fuzzy tokens, to output a list of matching n-grams and fuzzy tokens; based on the list of matching n-grams and fuzzy tokens, automatically identify, from the glossary terms, candidate glossary term matches for each of the input terms; and automatically calculate one or more scores that quantify the match between each of the candidate glossary term matches and its respective input term.

In some embodiments, the calculation of the one or more scores that quantify the match comprises: calculating a match score between each of the input terms and each of its identified candidate glossary term matches, as: a sum of the similarity scores of the fuzzy tokens associated with the respective candidate glossary term matches; the sum being normalized to a length of the fuzzy tokens associated with the respective candidate glossary term matches, relative to a total length of the input terms; the normalized sum being factored by a ratio between (a) a number of words in each of the candidate glossary term matches whose fuzzy tokens were matched with the comparison step, and (b) a total number of words in each of the candidate glossary term matches.

In some embodiments, the calculation of the one or more scores that quantify the match comprises: calculating a relation score between each of the input terms and each of its identified candidate glossary term matches, as: a sum of the similarity scores of the fuzzy tokens associated with the respective candidate glossary term matches; the sum being normalized to a length of the fuzzy tokens associated with the respective candidate glossary term matches, relative to a total length of the input terms that match the words of each of the respective candidate glossary term matches; the normalized sum being factored by a ratio between (a) a number of words in each of the candidate glossary term matches whose fuzzy tokens were matched with the comparison step, and (b) a total number of words in each of the candidate glossary term matches.

In some embodiments, each of the fuzzy tokens consists of a subset of the letters of its respective glossary term.

In some embodiments, the calculation of the similarity score comprises calculating a distance between the respective fuzzy token and its respective word.

In some embodiments, in the calculation of the similarity score, a smaller weight is given to vowel omission than to consonant omission.

In some embodiments, the separating of each of the input terms into multiple the input tokens is based on a location in the respective input term of at least one of: a separator character, a white space, and a medial capital.

In some embodiments, the generated n-grams are of various lengths, from a length of two letters up to a length of the respective input token.

In some embodiments, the method further comprises, or the program code is further executable for, filtering out the candidate glossary term matches, based on the similarity scores of the fuzzy tokens.

In addition to the exemplary aspects and embodiments described above, further aspects and embodiments will become apparent by reference to the figures and by study of the following detailed description.

BRIEF DESCRIPTION OF THE FIGURES

Exemplary embodiments are illustrated in referenced figures. Dimensions of components and features shown in the figures are generally chosen for convenience and clarity of presentation and are not necessarily shown to scale. The figures are listed below.

DETAILED DESCRIPTION

Disclosed herein is a computer-implemented method, also embodied as a system and a computer program product, for fuzzy matching of obscure texts with meaningful terms included in a glossary.

The obscure texts may be, for example, metadata included in structured digital datasets, such as tabular databases, files with delimiter-separated values, etc. For instance, a tabular database may include obscure texts in its column, table, and/or schema names, whereas a file with delimiter-separated values (e.g., a CSV, or "Comma-Separated Values" file) may include such obscure texts in its headers. Such names or headers are often made up of strings of obscure, non-dictionary text that are meant to resemble real, dictionary words or terms. For example, a column in a database may be named "dcmntID," doc_ID," or "DID," intending to resemble the dictionary words "document identifier." Namely, the column name may be some abbreviation selected arbitrarily by whoever set up the database. The problem with matching such abbreviations to glossary terms is that the abbreviations do not typically abide by strict rules of how glossary terms should be abbreviated. Rather, the persons making up the metadata often decide on such abbreviations in an arbitrary manner, randomly (or pseudo-randomly) deciding which vowels and/or consonants to omit, which letters to capitalize, where to place separators (such as dots or underscores), etc.

Advantageously, the disclosed method may receive a large quantity of such obscure metadata as input, and automatically resolve each metadatum to its most suitable term in a provided glossary, such a glossary compiled by the organization which uses the database.

The disclosed method may be useful not only for resolving obscure metadata to glossary terms, but also for tasks such as automated text correction ("autocorrection"), automated text completion ("autocomplete"), etc., in which obscure texts manually typed on a computerized device are automatically corrected or completed, respectively. Similarly, the disclosed method may be useful in spell-checking of electronic documents, by proposing corrections to obscure texts included in a checked document. Furthermore, the disclosed method may be utilized for personal information discovery and anonymization, data categorization, dataset merging, and more.

Figure 1:
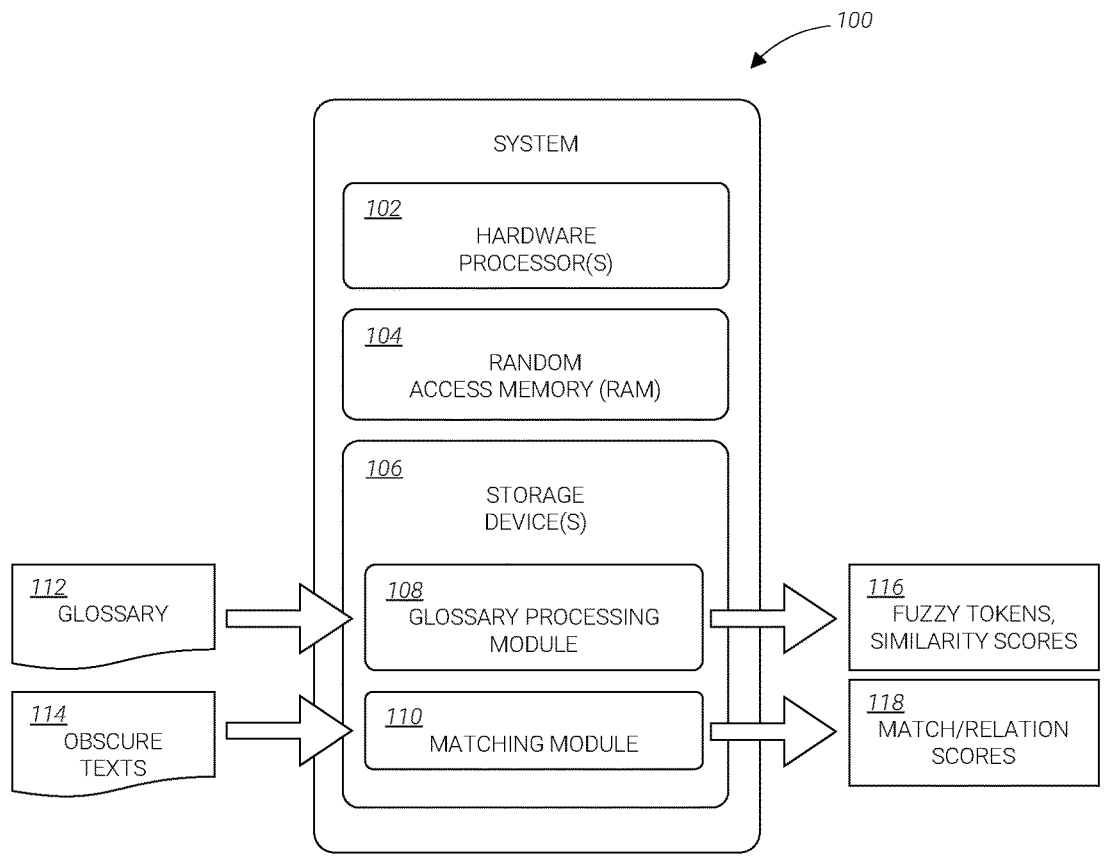
FIG. 1 is a block diagram of an exemplary system for fuzzy matching of obscure texts with glossary terms, according to an embodiment.

Reference is now made to FIG. 1, which shows a block diagram of an exemplary system 100 for fuzzy matching of obscure texts with glossary terms, according to an embodiment. System 100 may include one or more hardware processor(s) 102, a random-access memory (RAM) 104, and one or more non-transitory computer-readable storage device(s) 106.

Storage device(s) 106 may have stored thereon program instructions and/or components configured to operate hardware processor(s) 102. The program instructions may include one or more software modules, such as a glossary processing module 108 and a matching module 110. The software components may include an operating system having various software components and/or drivers for controlling and managing general system tasks (e.g., memory management, storage device control, power management, etc.), and facilitating communication between various hardware and software components.

System 100 may operate by loading instructions of glossary processing module 108 and matching module 110 into RAM 104 as they are being executed by processor(s) 102. The instructions of glossary processing module 108 may cause system 100 to receive a glossary 112, process it, and output fuzzy tokens with corresponding similarity scores 116. The instructions of matching module 110, in turn, may cause system 100 to receive multiple input terms (namely, obscure texts) 114, process them, match them to terms from glossary 112, and output one or more scores 118 that quantify that match. The instructions of modules 108 and 110 are discussed in more detail further below.

System 100 as described herein is only an exemplary embodiment of the present invention, and in practice may be implemented in hardware only, software only, or a combination of both hardware and software. System 100 may have more or fewer components and modules than shown, may combine two or more of the components, or may have a different configuration or arrangement of the components. For instance, modules 108 and 110 may be embodied in a single software module, or each may be included in its own, separate system of the type of system 100.

System 100 may include any additional component enabling it to function as an operable computer system, such as a motherboard, data busses, power supply, a network interface card, a display, an input device (e.g., keyboard, pointing device, touch-sensitive display), etc. (not shown). Moreover, components of system 100 may be co-located or distributed, or the system may be configured to run as one or more cloud computing "instances," "containers," "virtual machines," or other types of encapsulated software applications, as known in the art.

The instructions of glossary processing module 108 are now discussed with reference to the flowchart of FIG. 2, which illustrates a method 200 for processing a glossary in preparation for matching terms of the glossary with input terms (obscure texts). Subsequently, the instructions of matching module 110 are discussed with reference to the flowchart of FIG. 3, which illustrates a method 300 for matching terms of the glossary with input terms. These are described as two separate methods for convenience only. In practice, the steps of method 300 may be executed immediately following the steps of method 200 every time the overall method of the invention is to be performed. However, keeping these two methods separate, for example as two separate software modules, may be beneficial if there is one glossary but multiple potential sets of metadata: method 200 may be executed once, and its results be stored in a non-transitory computer-readable storage medium; then, whenever there is a set of metadata to be matched (e.g., a set of column names of a particular database), method 300 may be executed, building upon the stored results of the earlier execution of method 200.

Steps of methods 200 and 300 may either be performed in the order they are presented or in a different order (or even in parallel), as long as the order allows for a necessary input to a certain step to be obtained from an output of an earlier step. In addition, the steps of methods 200 and 300 may be performed automatically (e.g., by system 100 of FIG. 1), unless specifically stated otherwise.

Figure 2:
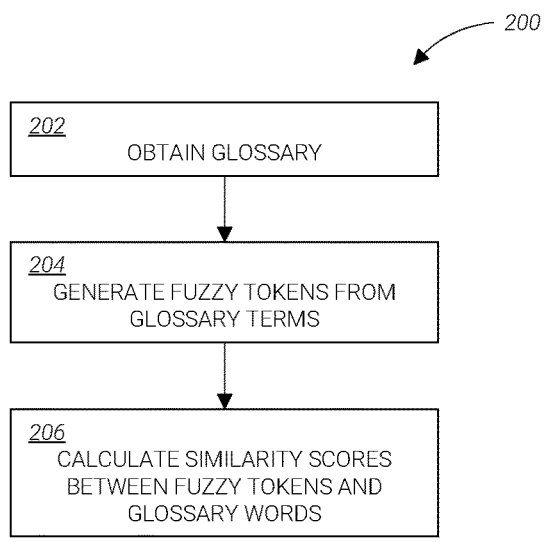
FIG. 2 is a flowchart of a method for processing a glossary in preparation for matching terms of the glossary with input terms (obscure texts), according to an embodiment.

Specific reference is now made to FIG. 2, illustrating method 200:

In a step 202, a glossary may be obtained, including multiple glossary terms. The glossary may be embodied by a digital text file including the glossary terms. Each glossary term may be comprised of one or multiple words, typically dictionary words that are correctly spelled. Some glossary terms may include words that are not dictionary words per se but are rather used in a specific professional jargon.

In a step 204, a fuzzy token generator may be operated to generate multiple fuzzy tokens from each word of each of the glossary terms. The fuzzy token generator may be a software algorithm that is configured to generate multiple aberrations for a given word. For example, for the word "identity" (which may included in the glossary term "identity card"), the fuzzy token generator may generate aberrations (fuzzy tokens) such as "identty," "idntty," "idnt," "id," and optionally more. The fuzzy token generator may generally operate by removing one or more letters from the original word, such that each generated fuzzy token consists of a subset of the letters of the original word. The length of each generated fuzzy token may be at least two letters (taken from the respective word).

The fuzzy tokens generated by the fuzzy token generator may include, for example, at least some of the following: the glossary word itself (without changes); the glossary word with omission of one or more vowels and/or one or more consonants; the glossary words with merging of double consonants (twice the same consonant, consecutively) into one consonant; abbreviations of the glossary word; conversion of an irregular plural (e.g., "wolves") to a singular form (e.g., "wolf"); omission of a suffix (e.g, four-letter suffixes such as "ness," "ship," "ment," "ance," "ence," "able," "ible;" three-letter suffixes such as "ing," "ion," "ful," "ies," "acy," "dom," "ism," "ist;" and/or regular plural suffixes (such as "s," "es"); a combination of fuzzy tokens generated for syllables of the glossary word.

The latter option (combination of fuzzy tokens generated for syllables of the glossary word) may be better understood with an example: Assume a glossary word "breakdown." A syllable detection/segmentation algorithm, as known in the art, may be used to determine that "breakdown" is comprised of two syllables, "break" and "down." Then, the fuzzy token generator may be applied to each of these syllables, to generate multiple fuzzy tokens from each (for example, using any of the techniques in the previous paragraph):

Break: br (30), bk (30), brak (48), break (52), brek (48), brk (45).

Down: do (30), dwn (45), down (48).

The numbers in parentheses next to each syllable fuzzy token are that token's similarity score, which is discussed below in greater detail. Briefly, that score denotes the similarity between the syllable fuzzy token and its respective glossary word. So, for example, 30 is the similarity score between the syllable fuzzy token "br" and the glossary word "breakdown."

Following the generation of the syllable fuzzy tokens, different combinations of these syllable fuzzy tokens may be created, to form the final fuzzy tokens that are eventually provided by step 204. To create each combination, one syllable fuzzy token of each syllable is used (namely, a cartesian product of the fuzzy tokens generated from each of the syllables). For example, by combining "brk" (45) (from the syllable "break") and "dwn" (45) (from the syllable "down"), a fuzzy token "brkdwn" (90) may be created.

Since the number of such combination may occasionally be very large (especially for long words with many syllables), a limit is optionally imposed on this number, for considerations of computational efficiency (if it is estimated that the lengthy processing of a large number of fuzzy tokens is unlikely to contribute much to overall accuracy of method 200 and/or method 300). For example, the limit may be to the number of fuzzy tokens generated per syllable (e.g., up to 5-10 tokens, or any other user-defined value). As another example, the limit may be imposed based on the similarity score associated with each syllable fuzzy token: only syllable fuzzy tokens having a similarity score above a certain threshold (e.g., a value between 50-70) may be selected, or the top-k syllable fuzzy tokens may be selected (namely, a predefined number of syllable fuzzy tokens having the highest similarity scores).

Additionally or alternatively, a limit may also be imposed on the total number of fuzzy tokens generated in step 204 (irrespective of the limit mentioned above with respect to the syllable fuzzy tokens), for similar considerations. This may include, for example, a limit on the number of tokens per glossary word, such as selection of those fuzzy tokens per glossary word which have a similarity score above a certain threshold (e.g., a value between 50-70), or the top-k fuzzy tokens per glossary word (namely, a predefined number of fuzzy tokens per glossary word which have the highest similarity scores).

Step 204 may occasionally yield duplicate fuzzy tokens, such as the fuzzy token "id" that may originate from both "identity" and "identifier." Therefore, the list of generated fuzzy tokens may undergo deduplication, so that it includes only unique fuzzy tokens each associated with its originating glossary word(s).

Optionally, before operating the fuzzy token generator, its configuration may be augmented with knowledge as to specific characteristics of the input terms (the obscure texts) that are to be later matched with the glossary terms. To this end, automatic or manual analysis of the input terms may be performed, to check for aberration patterns existing in at least some of the input terms. The analysis may uncover the fact that, for instance, some of the input terms omit all vowels (e.g., "dcmnt" for "document"), use certain abbreviations (e.g., "ID" for "identifier"), combine words using medical capitals (e.g., "DocumentIdentifier" for "Document Identifier"), separate words with a separator character (e.g., a dot or an underscore) instead of a white space, use numbers to represent words (e.g., "2" for "to" or "4" for "for"), and/or the like. The fuzzy token generator may then be configured according to any aberration patterns found, such that it also generates, for each glossary term, fuzzy tokens respective of the patterns (e.g., generate "cust_email" and "cust.email" for the glossary term "customer email"), and does not generate (to save computational time) fuzzy tokens that resemble patterns not existing in any of the input terms.

In a step 206, a similarity score may be calculated for each of the generated fuzzy tokens. The similarity score denotes a similarity between the fuzzy token and its respective glossary word. In case a certain fuzzy token originates from more than one glossary word (given the deduplication of the generated fuzzy tokens), multiple similarity scores may be generated for that fuzzy token, once for each relationship between that fuzzy token and a certain glossary word. For example, there may be one similarity score between the fuzzy token "id" and the glossary word "identity," and a different similarity score between that fuzzy token and the glossary word "identify."

The calculation of the similarity score may be based on a distance metric that is optionally calculated according to the following rules: Every fuzzy token may be assigned an initial similarity score of 100, which is then reduced according to "penalties" for characters (e.g., individual letters, numbers, symbols) that are missing from the fuzzy token, namely—omitted from its originating glossary word. For instance, the omission of a consonant (e.g., the fuzzy token "car" for the glossary word "card") may be associated with a relatively high penalty, whereas the omission of a vowel (e.g., the fuzzy token "crd" for the glossary word "card") may be associated with a relatively low penalty, because is more common for creators of metadata to omit vowels from an original, intended word than to omit consonants. As another example, the omission of a double consonant (e.g., the fuzzy token "adres" for the glossary word "address") may be associated with a penalty lower than the penalty for a missing single consonant, again because such omission is quite common in metadata creation. As a further example, the omission of a suffix (e.g., the fuzzy token "kind" for the glossary word "kindness") may be associated with a relatively low penalty, for the same reason. As yet another example, use of common abbreviations (e.g., the fuzzy token "ID" for the glossary word "identifier") may be associated with a relatively low penalty (or, in some cases, with no penalty at all), because these common abbreviations have been predetermined to be closely associated with their glossary words (see the discussion regarding the augmentation of the fuzzy token generator in step 204 above).

A penalty listed above as "relatively low" may be, for example, any value between 1 and 10. A penalty listed above as "relatively high" may be, for example, any value between 15 and 33. Of course, when a certain combination of relatively high and relatively low penalties is selected, the lowest "relatively high" penalty is higher than the highest "relatively low" penalty.

As a simplistic, illustrative example, consider the calculation of similarity scores for the fuzzy terms "blood," "blod," and "bld," originating from the glossary word "blood." Assume that one low penalty is set to 5, an even lower penalty is set to 3, and a high penalty is set to 30. Accordingly, the similarity scores may be calculated as follows:

"Blood": 100 (because no omissions were made compared to the original glossary word.
"Blod": 97 (because the merging of the double vowel "oo" into the single vowel "o" is penalized by 3, not by 5).
"Bld": 90 (because two vowels (two o's) were omitted, each penalized by 5).

While the simplistic example above is based on three penalty values (3, 5, and 30), it is certainly possible to calculate the similarity score based on a greater number of penalty values, to more accurately address each type of character omission.

Also, the scale of 0-100 for the similarity score has been chosen here merely for simplicity of illustration. The similarity score may just as well be defined within any desired range, such as between 0-1, as long as the rationale behind the penalties discussed above is followed (such as by scaling the penalties relative to the breadth of the similarity score range).

To summarize the steps of method 200, multiple glossary terms are processed in order to generate, from each word of each term, multiple fuzzy tokens that are each a subset of the letters of the original word. Then, the similarity between each fuzzy token and its originating word is scored. By way of example, the following fuzzy tokens and similarity scores (shown in parentheses) may be produced from the words of the glossary term "identity card":

"identity": identty (95), idntt (90), idnt (85), idn (75), idt (75), id (60), . . . .
"card": crd (95), cd (60), cr (50), . . . .

If the glossary also included the word "credit," then some of its resulting fuzzy tokens may have been identical to some fuzzy tokens resulting from the word "card." Accordingly, since the list of fuzzy tokens has been deduplicated, each such fuzzy token may have a different score of similarity to each different glossary word:

crd→ card (95), crd→ credit (75);
cd→ card (60), cd→ credit (40);
cr→ card (50), cr→ credit (40).

Figure 3:
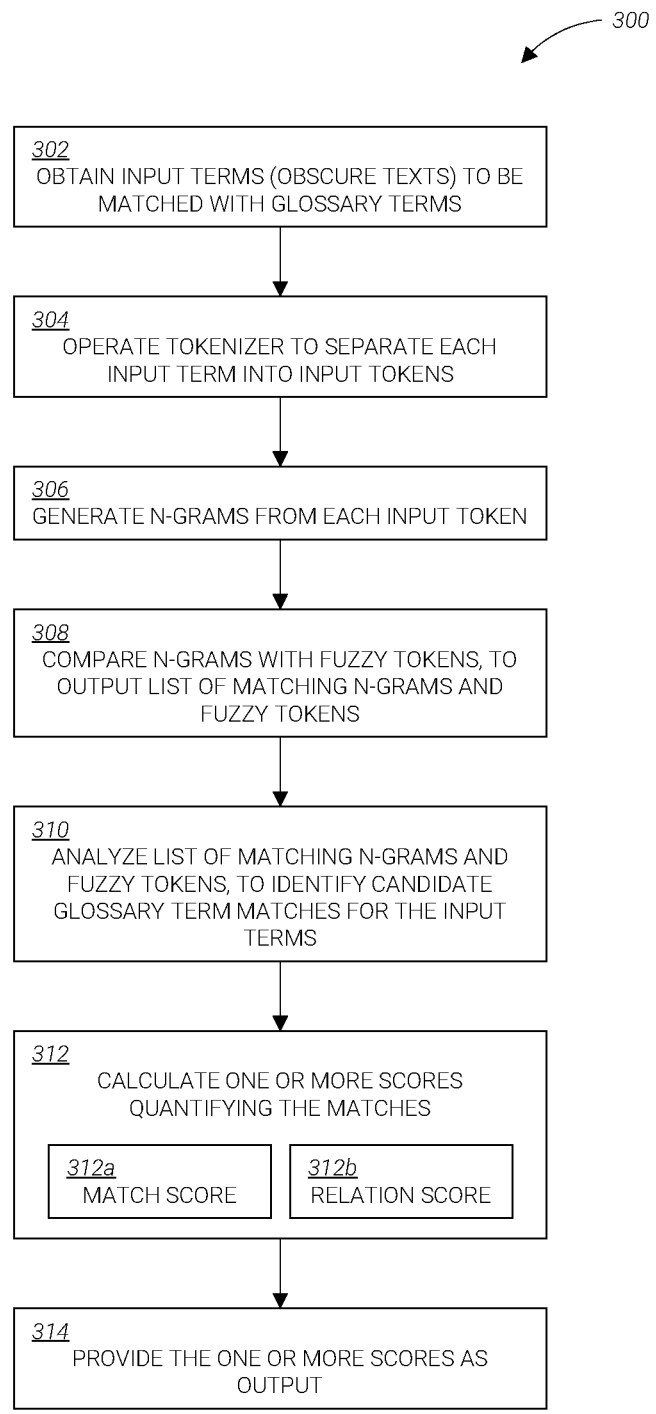
FIG. 3 is a flowchart of a method for matching terms of the glossary with input terms, according to an embodiment.

Specific reference is now made to FIG. 3, illustrating method 300:

In a step 302, multiple input terms (obscure texts), to be matched with the multiple glossary terms, are obtained—for example from a database schema, from a delimiter-separated values file, or the like. These input terms, as briefly discussed above, may be arbitrary aberrations of terms from the glossary. For example, an input term such as "crdcrdnmbr," "creditCardNo," or "crd.crd.no" may exist, whose creator intended to refer to the glossary term "credit card number."

In a step 304, a tokenizer may be operated to separate each of the input terms into multiple input tokens, under the assumption that each such input token should ultimately match a fuzzy token and consequently its originating glossary word. The tokenizer may be a software algorithm that is configured to separate an input term to its constituents based on a location, in the input term, of a separator character (e.g., a dot, an underscore, etc.), a white space, and/or a medial capital. For example, the input term "crd.crd.no" may be separated into the input tokens "crd," "crd," and "no," based on the locations of the two dots. As another example, the input term "creditCardNo" may be similarly separated into the same three input tokens, based on the location of the capital letters "C" and "N" that each indicates the beginning of a new token.

Optionally, before operating the tokenizer, its configuration may be augmented with knowledge as to specific characteristics of the input terms (the obscure texts), somewhat similarly to what has been discussed above regarding the augmentation of the fuzzy token generator. A similar style of automatic or manual analysis of the input terms may be performed (or the results of the previous analysis, done in favor of augmenting the fuzzy token generator, be utilized), to check for separation patterns existing in at least some of the input terms. The analysis may uncover the fact that, for instance, a certain pattern of separation does not exist in any of the input terms (e.g., there is no use of dots or underscores to separate tokens), and therefore the tokenizer can be configured not to look for the existence of the pertinent separator. This may save computational time.

Step 304 may occasionally yield duplicate input tokens, such as the input token "no" that may originate from input terms like "cardNo," ID.no," and "DocNo." Therefore, the list of input tokens that were separated from the input terms may undergo deduplication, so that it includes only unique input tokens each associated with its originating input term(s).

In a step 306, multiple n-grams may be generated from each of the input tokens. Each n-gram is a contiguous sequence of n letters, where n is an integer between 2 and the length of the respective input token. For example, for the input token "card," the following n-grams may be generated:

2-grams: ca, ar, rd;
3-grams: car, ard;
4-gram: card.

Each generated n-gram may be stored together with an indicator of its position within its originating input token. For example (with the position indicators in parentheses):

ca (0), ar (1), rd (2), car (0), and (1), card (0).

If a certain n-gram exists in two (or more) positions in the originating input token, then two (or more) location indicators may be stored with that particular n-gram.

Step 306 may often yield duplicate n-grams, whether originating from the same input token of from different input token. Therefore, the list of n-grams for all input tokens may undergo deduplication, so that it includes only unique n-grams, each associated with all of its originating input token(s) as well as with its position within each of these input token(s).

In a step 308, the n-grams may be compared with the fuzzy tokens, to output a list of exactly-matching n-grams and fuzzy tokens, while keeping track, of course, of which input text is the origin of those matching n-grams (thus, information is also stored as to correspondence between fuzzy tokens and input texts, per the matching of step 308). For example, assuming that a certain n-gram is an exact match for one fuzzy token, the list of matching n-grams and fuzzy tokens may include an entry such as crd→crd (card:95, credit:60), among other entries based on the same rationale.

That exemplary entry indicates that the 3-gram "crd" (originating, for instance, from an input text "cardNO") exactly matches the fuzzy token "crd," originating both from the glossary word "card" with a similarity score of 95, as well as from the glossary word "credit" with a similarity score of 60).

In a step 310, the list of matching n-grams and fuzzy tokens may be analyzed, to identify, from the glossary terms, candidate glossary term matches (also referred to herein simply as "candidates") for each of the input terms. Namely, each input term is matched with one or more glossary terms, which are considered candidate matches for that input term. For example, glossary term candidates for the input term "docID" may be "document identifier," "doctor identifier," and "department of corrections identifier."

The analysis of step 310 may include a process that finds and selects the smallest set of fuzzy tokens (from the list generated in step 308) that covers the maximal length of characters of the corresponding input text (per step 308).

This process may receive, as input, a list of all fuzzy tokens that correspond, per step 308, to each of the input texts. Then, the process may iteratively generate different combinations (non-overlapping) of these fuzzy tokens and evaluate them by calculating an intermediate score for each combination, denoting the similarity between the respective combination and the input text corresponding to the fuzzy tokens in that combination.

Before explaining the iterative generation of the combinations of fuzzy tokens, the intermediate score is discussed. The intermediate score may be calculated as a sum of 'match scores' of all individual fuzzy tokens in each combination to their corresponding input text; such match score is discussed below, in the description of a step 312a, and the same manner of calculation applies here, mutatis mutandis. Assume, for example, an input text "bank_user_accnt" and a glossary with the following terms: "account user code," "use," and "count.". In step 308, the fuzzy tokens "accnt", "user", "accn", "use", "cnt" and "us" were matched with various n-grams. One possible combination could be "accnt" and "user", the intermediate score for which may be calculated in two stages:

First, calculating a match score for the fuzzy token "accnt" (originating from the term token account with similarity score 90) vs. the input text "bank_user_accnt." Per the method of calculation described in step 312a below, that match score is (with minor rounding):

$$90 \times \frac{5}{13} = 34.6$$

Second, calculating a match score for the fuzzy token "user" (originating from the term token "user" with similarity score 100) vs. "bank_user_accnt." Per the method of calculation described in step 312a below, that match score is (with minor rounding):

$$100 \times \frac{4}{13} = 30.7$$

The sum of these two match scores is therefore 65.3.

The iterative generation of different combinations fuzzy tokens per each corresponding input text is now discussed:

First, these fuzzy tokens (also referred to herein as "candidate fuzzy token," as they are precursors for the eventual candidate glossary terms) may be sorted according to their individual match scores, from high to low. For example, consider the following sorted list of candidate fuzzy tokens matched to the input text "bank_user_accnt": "accnt," "user," "accn," "use," "cnt," and "us."

Second, the highest fuzzy token in that sorted list ("accnt" in the above example), may be stored in a temporary list of candidate fuzzy token combinations. Then, the remaining fuzzy tokens in the list may be inspected, one or more at the time, to check what intermediate score results from its or their combination with the fuzzy token already in the temporary list. Overlapping fuzzy tokens may be ignored, based on the position indicators created previously, in step 306. The combination with the highest intermediate score, and optionally the one having the best coverage of the corresponding input text, may then be stored in the temporary list. In case there are multiple combination with the same highest intermediate score, preference may be given to the combination with the better coverage. In case also the coverage is identical, preference may be given to the combination comprised of lesser fuzzy tokens.

Then, the same check as in the previous (second) stage may be performed, this time beginning with the second-highest fuzzy token in that sorted list ("user" in the above example), and checking the lower-scored fuzzy tokens for possible combinations with that second-highest fuzzy token. The combination resulting from this stage may be appended to the temporary list.

This iterative process may be repeated a predetermined number of times, such that the temporary list includes only a predetermined number of candidate fuzzy token combinations which, by the nature of this process, will have the highest intermediate scores and/or best coverage.

The output of step 310 may therefore be candidate glossary term matches for each of the input terms, wherein these candidate glossary term matches are those glossary terms associated with the candidate fuzzy token combinations resulting from the above iterative process (namely, the candidate fuzzy token combinations originating from these glossary terms).

In a step 312, one or more scores that quantify the match between each of the candidate glossary term matches and its respective input term may be calculated and provided as an output of method 300 (e.g., to a user or to a software program that further utilizes these scored matches).

One example of a score, referred to here as a 'match score' 312a, may be calculated as the sum of all fuzzy token scores of the respective candidates, normalized to the length of the fuzzy tokens relative to the total length of the input terms, and factored by the ratio between the number of glossary words that matched and the number of words in the candidate. More specifically, the match score may be calculated as a sum of the similarity scores of the fuzzy tokens associated with the respective candidates; the sum being normalized to a length of the fuzzy tokens associated with the respective candidates, relative to a total length of the input terms; the normalized sum being factored (multiplied) by a ratio between (a) the number of words (in each of the candidates) whose fuzzy tokens were matched in step 308, and (b) the total number of words in each of the candidates.

By way of example, assume that the match score is to be calculated between the candidate glossary term "account user code" and the input text "bank_user_accnt," whose match has been identified in step 310 above. The pertinent fuzzy tokens of "account user code" are "accnt" and "user." Accordingly, the following parameters participate in the calculation:

Matched fuzzy token 1: "accnt"
 Length: 5 letters [denoted $L_1$],
 Similarity score to its originating glossary word ("account"): 90 [denoted $S_1$];
Matched fuzzy token 2: "user"
 Length: 4 letters [denoted $L_2$],
 Similarity score to its originating glossary word ("user"): 100 [denoted $S_2$];

Number of glossary words that matched: 2 ("account" and "user");
Number of words in the candidate glossary term: 3 ("account," "user," "code");
Ratio between the number of glossary words that matched and the number of words in the candidate glossary term: ⅔ [denoted F];
Total length of all input terms ("bank," "user," "accnt") in the input text: 13 [denoted $L_{IT}$].
The match score may be calculated according to:

$$\text{Fuzzy Token Match score } (i) = S_i \times \frac{L_i}{L_{IT}}$$

$$\text{Term Match score} = \left(S_1 \times \frac{L_1}{L_{IT}} + S_2 \times \frac{L_2}{L_{IT}} + \ldots + S_N \times \frac{L_N}{L_{IT}}\right) \times F,$$

where N is the $N^{th}$ matched fuzzy token. In the simplistic example above there are only two matched fuzzy tokens.

Given the exemplary parameters above, the match score is approximately 43.6:

$$\text{Match score} = \left(90 \times \frac{5}{13} + 100 \times \frac{4}{13}\right) \times \frac{2}{3}.$$

Another example of a score, referred to here as a 'relation score' 312b, may be calculated as the sum of all fuzzy token scores of the respective candidates, normalized to the length of the fuzzy tokens relative to the total length of only the input terms that match glossary words of the candidates, and factored by the ratio between the number of glossary words that matched and the number of words in the candidate. More specifically, the match score may be calculated as a sum of the similarity scores of the fuzzy tokens associated with the respective candidates; the sum being normalized to a length of the fuzzy tokens associated with the respective candidates, relative to a total length of just the input terms that match glossary words of the candidates; the normalized sum being factored (multiplied) by a ratio between (a) the number of words (in each of the candidates) whose fuzzy tokens were matched in step 308, and (b) the total number of words in each of the candidates.

Continuing upon the previous example, of the calculation of the match score, the relation score may be calculated according to:

$$\text{Relation score} = \left(S_1 \times \frac{L_1}{L_M} + S_2 \times \frac{L_2}{L_M} + \ldots + S_N \times \frac{L_N}{L_M}\right) \times F,$$

where $L_M$ denotes the total length of only the input terms that match glossary words of the candidates. In this example, $L_M$ equals 9, which is the total length of the input terms "user" and "accnt" which match the glossary words "user" and "account," respectively.

Given the exemplary parameters above, the relation score is approximately 63:

$$\text{Relation score} = \left(90 \times \frac{5}{9} + 100 \times \frac{4}{9}\right) \times \frac{2}{3}.$$

Notably, the match score and relation score differ in their normalization component: whereas the match score normalizes the fuzzy token scores to the relative lengths of the fuzzy tokens and all the input terms, the relation score normalizes the fuzzy token scores to the relative lengths of the fuzzy tokens and just those input terms having matching words in the candidate glossary term. Therefore, the relation score will be higher than the match score in most scenarios (and the scores will be equal when all words in the candidate glossary term have matching input terms). The match score and the relation score do share the rationale of summing the similarity scores of the fuzzy tokens, normalizing them to relative fuzzy token/input term lengths, and factoring them to relative to a ratio between the number of glossary words whose fuzzy tokens have matched the input terms and the number of all glossary words in the respective candidate glossary term.

It is also possible to calculate the one or more scores of step 312 by other means, such as using any conventional algorithm configured to quantify text similarity.

Finally, in a step 314, the one or more calculated scores may be provided as an output, for example to a user of method 300 or to a software program that requested execution of the method, for example via an Application Programming Interface (API) associated with the method.

Generally, one or both of methods 200 and 300 may be executed via an API which provides access to these methods from an external software program. The external software program may provide, through the API, information such as the glossary, the input text, and optionally also user-selected parameters such as the aforementioned threshold of the similarity score (step 310) and the number of the top-k candidates (also in step 310). The API may then provide the output of one or both of methods 200 and 300 to the external software application; for example, the API may provide the fuzzy tokens and associated similarity scores that are the outputs of method 200, and the one or more scores calculated at step 312 as the output of method 300.

Optionally, method 300 also includes one or more additional steps (not shown) in which the one or more scores calculated in step 312 are put to use. These one or more additional steps may be performed instead of or in addition to step 314, of providing the score(s) as an output.

In a first such optional step, an electronic document is generated, the document showing associations between input texts and glossary terms. The associations shown may be those having the highest match score 312a and/or relation score 312b. For example, only a single association between a certain input text and a certain glossary term is shown in the document—the association having the highest match score 312a and/or relation score 312b. A more extensive document may show two or more associations per input text or per glossary term.

In a second optional step, an indication may be issued as to which input text is metadata (e.g., column name) of data (e.g., contents of a database column) which includes personal information. This may be made possible when the glossary includes (optionally, exclusively) terms that are deemed to be associated with such personal information, such as "Government ID number," "Health status," "Level of education," or "Marital status," to name a few examples. It may be also possible to follow up on this indication (or to replace it) with automatic anonymization (as conventionally known in the art) of the data that is deemed to include personal information.

The term "personal information," as used herein, refers to information about an individual person, including (1) information that can be used to distinguish or trace the individual's identity, such as name, government-issued identification number, date and place of birth, mother's maiden name, or biometric records; and (2) information that is linked or linkable to the individual, such as medical, educational, financial, and employment information.

In a third optional step, data included in a structured digital dataset (e.g., a tabular database) may be categorized based on the score(s) calculated in step 312. This is somewhat similar to the indication of personal information discussed above, but with the glossary, instead, including terms belonging to any desired category (which is defined for each term inside the glossary, or which is defined globally for the entire glossary). If certain input text that is matched to a glossary term happens to be metadata (e.g., column name) of certain data (e.g., contents of a database column), then it can be concluded that the certain data likely belong to the category of that glossary term. By way of example, if the score(s) calculated in step 312 are indicative that a database column name "lcns_plt_nbr" likely matches the glossary term "License plate number," and that glossary term is defined as belonging to the category "vehicles," then the data included in rows of that database column may be determined to belong to the "vehicles" category.

In a fourth optional step, method 300 may be utilized in the merging of multiple structured datasets (e.g., tabular databases) into one. In such merging, it is required to know which columns in different ones of the datasets include the same type of information, and should therefore be merged into a single column in the resulting single dataset. Accordingly, method 300 may be executed multiple times, once per each dataset. When the score(s) calculated in step 312 of the multiple executions indicate that different input texts in the different datasets are a likable match with a single glossary term, it can be concluded that data associated with these input texts (e.g., contents of database columns whose column names are the input texts) is likely of the same type and can hence be merged into a single column.

A fifth optional step may include replacing each of the input texts immediately after it has been typed by a user (and before any subsequent text is typed by the user) with the glossary term having the highest score(s) 312 relative to that input text. This is commonly known as "autocomplete" or "autocorrect" functionality. The replacement may either be done automatically, responsive to a detection of a typed input text, or manually, after presenting a prompt to the user with a suggestion to autocomplete or autocorrect, and receiving confirmation from the user to perform the replacement. Based on the same rationale, method 300 also includes a step (not shown) of spell-checking an electronic document, to locate obscure input texts and propose their replacement with the glossary term having the highest score(s) 312 relative to each such obscure input text.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire. Rather, the computer readable storage medium is a non-transient (i.e., not-volatile) medium.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, a field-programmable gate array (FPGA), or a programmable logic array (PLA) may execute the computer readable program instructions by utilizing state information of the computer readable program instructions to personalize the electronic circuitry, in order to perform aspects of the present invention. In some embodiments, electronic circuitry including, for example, an application-specific integrated circuit (ASIC), may be incorporate the computer readable program instructions already at time of fabrication, such that the ASIC is configured to execute these instructions without programming.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In the description and claims, each of the terms "substantially," "essentially," and forms thereof, when describing a numerical value, means up to a 20% deviation (namely, ±20%) from that value. Similarly, when such a term describes a numerical range, it means up to a 20% broader range-10% over that explicit range and 10% below it).

In the description, any given numerical range should be considered to have specifically disclosed all the possible subranges as well as individual numerical values within that range, such that each such subrange and individual numerical value constitutes an embodiment of the invention. This applies regardless of the breadth of the range. For example, description of a range of integers from 1 to 6 should be considered to have specifically disclosed subranges such as from 1 to 3, from 1 to 4, from 1 to 5, from 2 to 4, from 2 to 6, from 3 to 6, etc., as well as individual numbers within that range, for example, 1, 4, and 6. Similarly, description of a range of fractions, for example from 0.6 to 1.1, should be considered to have specifically disclosed subranges such as from 0.6 to 0.9, from 0.7 to 1.1, from 0.9 to 1, from 0.8 to 0.9, from 0.6 to 1.1, from 1 to 1.1 etc., as well as individual numbers within that range, for example 0.7, 1, and 1.1.

The descriptions of the various embodiments of the present invention have been presented for purposes of illustration, but are not intended to be exhaustive or limited to the explicit descriptions. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the description and claims of the application, each of the words "comprise," "include," and "have," as well as forms thereof, are not necessarily limited to members in a list with which the words may be associated.

Where there are inconsistencies between the description and any document incorporated by reference or otherwise relied upon, it is intended that the present description controls.

What is claimed is:

1. A computer-implemented method comprising:
   obtaining multiple glossary terms each comprising one or more words; automatically operating a fuzzy token generator to generate multiple fuzzy tokens from each word of each of the glossary terms;
   automatically calculating a similarity score for each of the fuzzy tokens, wherein the similarity score denotes a similarity between the respective fuzzy token and its respective word;
   obtaining multiple input terms to be matched with the multiple glossary terms;
   automatically operating a tokenizer to separate each of the input terms into multiple input tokens;
   automatically generating multiple n-grams from each of the input tokens;
   automatically comparing the n-grams with the fuzzy tokens, to output a list of matching n-grams and fuzzy tokens;
   based on the list of matching n-grams and fuzzy tokens, automatically identifying, from the glossary terms, candidate glossary term matches for each of the input terms; and
   automatically calculating one or more scores that quantify the match between each of the candidate glossary term matches and its respective input term,
   wherein the calculation of the one or more scores that quantify the match comprises:
      calculating a match score between each of the input terms and each of its identified candidate glossary term matches, as:
         a sum of the similarity scores of the fuzzy tokens associated with the respective candidate glossary term matches,
         the sum being normalized to a length of the fuzzy tokens associated with the respective candidate glossary term matches, relative to a total length of the input terms, wherein the normalized sum being factored by a ratio between (a) a number of words in each of the candidate glossary term matches whose fuzzy tokens were matched with the automatically comparing step, and (b) a total number of words in each of the candidate glossary term matches.

2. The computer-implemented method of claim 1, wherein each of the fuzzy tokens consists of a subset of letters of its respective glossary term.

3. The computer-implemented method of claim 1, wherein the calculation of the similarity score comprises calculating a distance between the respective fuzzy token and its respective word.

4. The computer-implemented method of claim 3, wherein, in the calculation of the similarity score, a smaller weight is given to vowel omission than to consonant omission.

5. The computer-implemented method of claim 1, wherein the separating of each of the input terms into the multiple input tokens is based on a location in the respective input term of at least one selected from a group consisting of: a separator character, a white space, and a medial capital.

6. The computer-implemented method of claim 1, wherein the generated n-grams are of various lengths, from a length of two letters up to a length of the respective input token.

7. The computer-implemented method of claim 1, the method further comprising:
   filtering out the candidate glossary term matches, based on the similarity scores of the fuzzy tokens.

8. A system comprising:
   (a) at least one hardware processor; and
   (b) a non-transitory computer-readable storage medium having program code embodied therewith, the program code executable by said at least one hardware processor to:
      obtain multiple glossary terms each comprising one or more words; automatically operate a fuzzy token generator to generate multiple fuzzy tokens from each word of each of the glossary terms;
      automatically calculate a similarity score for each of the fuzzy tokens, wherein the similarity score denotes a similarity between the respective fuzzy token and its respective word;
      obtain multiple input terms to be matched with the multiple glossary terms; automatically operate a tokenizer to separate each of the input terms into multiple input tokens;
      automatically generate multiple n-grams from each of the input tokens;
      automatically compare the n-grams with the fuzzy tokens, to output a list of matching n-grams and fuzzy tokens;
      based on the list of matching n-grams and fuzzy tokens, automatically identify, from the glossary terms, candidate glossary term matches for each of the input terms; and
      automatically calculate one or more scores that quantify the match between each of the candidate glossary term matches and its respective input term,
      wherein the calculation of the one or more scores that quantify the match comprises:
         calculating a match score between each of the input terms and each of its identified candidate glossary term matches, as:
            a sum of the similarity scores of the fuzzy tokens associated with the respective candidate glossary term matches,
            the sum being normalized to a length of the fuzzy tokens associated with the respective candidate glossary term matches, relative to a total length of the input terms, wherein the normalized sum being factored by a ratio between (a) a number of words in each of the candidate glossary term matches whose fuzzy tokens were matched with the automatically comparing step, and (b) a total number of words in each of the candidate glossary term matches.

9. The system of claim 8, wherein each of the fuzzy tokens consists of a subset of letters of its respective glossary term.

10. The system of claim 8, wherein the calculation of the similarity score comprises calculating a distance between the respective fuzzy token and its respective word.

11. The system of claim 10, wherein, in the calculation of the similarity score, a smaller weight is given to vowel omission than to consonant omission.

12. The system of claim 8, wherein the separating of each of the input terms into the multiple input tokens is based on a location in the respective input term of at least one of: a separator character, a white space, and a medial capital.

13. The system of claim 8, wherein the generated n-grams are of various lengths, from a length of two letters up to a length of the respective input token.

14. The system of claim 8, further comprising filtering out the candidate glossary term matches, based on the similarity scores of the fuzzy tokens.

15. A computer-implemented method comprising:
- obtaining multiple glossary terms each comprising one or more words; automatically operating a fuzzy token generator to generate multiple fuzzy tokens from each word of each of the glossary terms;
- automatically calculating a similarity score for each of the fuzzy tokens, wherein the similarity score denotes a similarity between the respective fuzzy token and its respective word;
- obtaining multiple input terms to be matched with the multiple glossary terms;
- automatically operating a tokenizer to separate each of the input terms into multiple input tokens;
- automatically generating multiple n-grams from each of the input tokens;
- automatically comparing the n-grams with the fuzzy tokens, to output a list of matching n-grams and fuzzy tokens;
- based on the list of matching n-grams and fuzzy tokens, automatically identifying, from the glossary terms, candidate glossary term matches for each of the input terms; and
- automatically calculating one or more scores that quantify the match between each of the candidate glossary term matches and its respective input term, wherein the calculation of the one or more scores that quantify the match comprises:
- calculating a match score between each of the input terms and each of its identified candidate glossary term matches, as:
  - a sum of the similarity scores of the fuzzy tokens associated with the respective candidate glossary term matches,
  - the sum being normalized to a length of the fuzzy tokens associated with the respective candidate glossary term matches, relative to a total length of the input terms; and
- calculating a relation score between each of the input terms and each of its identified candidate glossary term matches, as:
  - a sum of the similarity scores of the fuzzy tokens associated with the respective candidate glossary term matches,
  - the sum being normalized to a length of the fuzzy tokens associated with the respective candidate glossary term matches, relative to a total length of the input terms that match the words of each of the respective candidate glossary term matches,
  - the normalized sum being factored by a ratio between (a) a number of words in each of the candidate glossary term matches whose fuzzy tokens were matched with the automatically comparing step, and (b) a total number of words in each of the candidate glossary term matches.

* * * * *